United States Patent
Tirumalai et al.

(10) Patent No.: US 6,341,370 B1
(45) Date of Patent: *Jan. 22, 2002

(54) INTEGRATION OF DATA PREFETCHING AND MODULO SCHEDULING USING POSTPASS PREFETCH INSERTION

(75) Inventors: Partha Pal Tirumalai, Fremont; Rajagopalan Mahadevan, Foster City, both of CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,269

(22) Filed: Apr. 24, 1998

(51) Int. Cl.[7] .................................................. G06F 9/45
(52) U.S. Cl. ............................... 717/5; 717/9; 712/207
(58) Field of Search .................... 395/705, 709; 712/207; 717/5, 9

(56) References Cited

U.S. PATENT DOCUMENTS

| | | | | |
|---|---|---|---|---|
| 5,664,193 A | * | 9/1997 | Tirumalai ........................ | 395/5 |
| 5,704,053 A | * | 12/1997 | Santhanam ................... | 712/207 |
| 5,809,308 A | * | 9/1998 | Tirumalai .................... | 395/709 |
| 5,835,776 A | * | 11/1998 | Tirumalai et al. ........... | 395/709 |
| 5,862,385 A | * | 1/1999 | Iitsuka .......................... | 717/9 |
| 5,867,711 A | * | 2/1999 | Subramanian et al. ...... | 395/709 |
| 5,920,724 A | * | 7/1999 | Chang ........................... | 717/9 |
| 5,930,507 A | * | 7/1999 | Nakahira et al. .............. | 717/5 |
| 5,930,510 A | * | 7/1999 | Beylin et al. .................. | 717/9 |
| 5,797,013 A | * | 9/1999 | Mahadevan et al. ........... | 717/9 |
| 5,950,007 A | * | 9/1999 | Nishiyama et al. ............ | 717/7 |
| 6,045,585 A | * | 4/2000 | Blainey ......................... | 717/5 |

* cited by examiner

Primary Examiner—Tuan Q. Dam
Assistant Examiner—Hoang-vu Antony Nguyen-Ba
(74) Attorney, Agent, or Firm—Skjerven Morrill MacPherson LLP; Samuel G. Campbell, III; D'Ann Naylor Rifai

(57) ABSTRACT

The present invention integrates data prefetching into a modulo scheduling technique to provide for the generation of assembly code having improved performance. Modulo scheduling can produce optimal steady state code for many important cases by sufficiently separating defining instructions (producers) from using instructions (consumers), thereby avoiding machine stall cycles and simultaneously maximizing processor utilization. Integrating data prefetching within modulo scheduling yields high performance assembly code by prefetching data from memory while at the same time using modulo scheduling to efficiently schedule the remaining operations. The invention integrates data prefetching into modulo scheduling by postponing prefetch insertion until after modulo scheduling is complete. Actual insertion of the prefetch instructions occurs in a postpass after the generation of appropriate prologue-kernel-epilogue code. Concurrently, appropriate rules are employed to permit the co-existence of data prefetching instructions within the modulo scheduled code. The present invention also simplifies the addition of data prefetching capabilities to a compiler already capable of modulo scheduling.

97 Claims, 4 Drawing Sheets

INTEGRATION OF DATA PREFETCHING AND MODULO SCHEDULING USING POSTPASS PREFETCH INSERTION

BACKGROUND OF THE INVENTION

The present invention relates to a method and apparatus for executing instructions in a computer. More specifically, the present invention relates to a method and apparatus for improving the performance of assembly code generated by an optimizing compiler. This is done by integrating data prefetching and modulo scheduling, and by inserting prefetch instructions generated after module scheduling has been performed.

Modern processors employ numerous techniques to provide the performance that today's applications require. One such technique is instruction pipelining. Instruction pipelining is a processing technique whereby multiple instructions are overlapped in execution. This simultaneous execution of instruction is sometimes referred to as instruction-level parallelism. It is a goal of pipelined architectures to maximize instruction-level parallelism.

In a processor having a pipelined architecture, one means of increasing instruction-level parallelism is the use of multiple pipelines, in which instructions are issued using a scheduler or similar hardware construct. Processors employing such constructs are commonly known as superscalar processors. Instructions may be scheduled for issue to the pipelines based on numerous factors, such as pipeline availability, op-code type, operand availability, data dependencies, and other factors. In such architectures, the processor's pipelines must be used efficiently to maximize instruction-level parallelism. This means that the pipelines are fed instructions as quickly as possible, while pipeline stalls are minimized.

To ensure that the various pipelines in superscalar processors are efficiently used, complex compilers have been created to generate code that takes maximum advantage of the of superscalar processors' capabilities. Such compilers orchestrate the issue and execution of instructions to maximize instruction level parallelism and so, throughput. One method employed in such compilers is modulo scheduling.

FIG. 1 illustrates the execution of seven iterations of a pipelined loop as scheduled for execution by a compiler having modulo scheduling capabilities. Modulo scheduling achieves instruction level parallelism by beginning the execution of one or more iterations of a loop before the previous iteration has completed. This is done by issuing instructions in the subsequent iteration(s) to available pipelines within the superscalar processor. A concept fundamental to modulo scheduling is initiating new iterations at fixed intervals. The interval employed is referred to as the initiation interval or iteration interval (II), and is exemplified in FIG. 1 by an iteration interval 100.

The scheduled length of a single iteration (trip length, or TL) is divided into stages, each one of a length equal to iteration interval 100. The number of stages that each iteration requires may be defined as:

$$SC = \frac{TL}{II} \quad (1)$$

where SC is stage count. The three phases of loop execution (after modulo-scheduling) are shown in FIG. 1 as a prologue 102, a kernel 104, and an epilogue 106. During prologue 102 and epilogue 106, not all stages of successive iterations execute. Only during kernel 104 are all stages of the loop being executed. Prologue 102 and epilogue 106 last for (SC-1)*II machine cycles. The number of times the loop is to be iterated is known as the trip count. If the trip count is relatively large, kernel 104 will last much longer than prologue 102 or epilogue 106. The primary performance metric for a modulo-scheduled loop is the iteration interval. It is a measure of the steady state throughput for loop iterations. Smaller iteration interval values imply higher throughput. Therefore, a modulo scheduler preferably attempts to derive a schedule that minimizes the iteration interval. The time required to execute n iterations is:

$$T(n) = (n+SC-1) \cdot II \quad (2)$$

The average time to execute one of these iterations is effectively:

$$T(n)_{iteration} = \frac{(n + SC - 1) \cdot II}{n} \quad (3)$$

As can be seen from Equation 3, $T(n)_{iteration}$ approaches II as n approaches infinity.

The execution of the loop scheduled in FIG. 1 begins with stage 0 of a first iteration 110. During the first II machine cycles, no other iteration executes concurrently. This exemplifies iteration interval 100. This also marks the beginning of prologue 102. After the first II machine cycles, first iteration 110 enters stage 1 and a second iteration 112 enters stage 0. New iterations (e.g., a third iteration 114) join every II machine cycles until a state is reached when all stages of different iterations are executing. This marks the beginning of kernel 104, and is exemplified by the execution of a fourth iteration 116, a fifth iteration 118, a sixth iteration 120, and a seventh iteration 122. Toward the end of loop execution, during epilogue 106, no new iterations are initiated and those that are in various stages of progress gradually complete.

Scheduling in a compiler employing modulo scheduling may proceed in a manner similar to the following. The data dependence graph (DDG), a directed graph, is constructed for the loop being scheduled. The nodes in this graph correspond to instructions, with the arcs corresponding to dependencies between them. Two attributes the arcs possess are latency and the dependence distance (also referred to as omega or "Ω"). Latency is the number of machine cycles of separation required between a source instruction and a sink (or destination) instruction. A source instruction usually provides some or all of the data used by a destination instruction. Omega represents the iteration distance between the two nodes (instructions). In other words, omega represents the number of loop iterations from the source instruction to the destination instruction. For example, data generated by a source instruction in the first iteration may not be needed until the third iteration, equating to an omega of two.

Prior to scheduling, two bounds on the maximum throughput are derived: the minimum iteration interval (MII)

and the recurrence minimum iteration interval (RMII). The MII is a bound on the minimum number of machine cycles needed to complete one iteration and is based only on processor resources. For example, if a loop has ten add operations and the processor is capable of executing at most two add operations per machine cycle, then the add unit resource would limit throughput to at most one iteration every five machine cycles. The MII is computed by determining the maximum throughput for each resource in terms of iterations per machine cycle, in turn, and taking the minimum of those maximum throughput values as the processor's maximum guaranteed throughput.

The RMII is a bound on the minimum number of clocks needed to complete one iteration and is based only on dependencies between nodes. DDG cycles imply that a value $x_i$ computed in some iteration i is used in a future iteration j and is needed to compute a similarly propagated value in iteration j. These circular dependencies place a limit on how rapidly iterations can execute because computing the values needed in the DDG cycle takes time. For each elementary DDG cycle, the ratio of the sum of the latencies (l) to the sum of the omegas (d) is computed. This value limits the iteration throughput because it takes l machine cycles to compute values in a DDG cycle that spans d iterations.

The fixed spacing between overlapped iterations forces a constraint on the scheduler other than the normal constraints imposed by the arcs in the DDG. Note that placing an operation at a time t implies that there exists a corresponding operation in the $k^{th}$ future iteration at (t+k*II). Operations that use the same resource must be scheduled such that they are executed at different times, modulo the II, to avoid stalls caused by a resource being in use. This is referred to as the modulo constraint. The modulo constraint implies that if an operation uses a resource at time $t_1$ and another operation uses that same resource at time $t_2$, then $t_1$ and $t_2$ must satisfy:

$$t_1 \bmod II \neq t_2 \bmod II \quad (4)$$

A modulo scheduler begins by attempting to derive a schedule using II=max (MII, RMII). If a schedule is not found, the II is incremented. The process repeats until a schedule is found or an upper limit is reached. After scheduling, the kernel has to be unrolled and definitions renamed to prevent values from successive iterations from overwriting each other, for example, by writing to the same registers. The minimum kernel unroll factor (KUF) necessary is determined by the longest lifetime divided by the II because corresponding new lifetimes begin every II machine cycles. Remaining iterations (up to KUF−1) are executed in a cleanup loop.

Compilers employing modulo-scheduling thus provide efficient utilization of superscalar architectures. However, in order to make efficient use of such architectures, instructions and data must be made available in a timely manner. To maintain the high data rates required, designers commonly employ multi-level memory architectures including, for example, main memory units and cache memory units. Additional memory levels are normally added in the form of multiple cache levels (e.g., on-chip and off-chip cache memory).

Some of today's microprocessor architectures extend this construct by delineating between the caching of instructions and data. Recently, specialized data caches have been included in certain microprocessor architectures to allow for the storage of certain information related on the basis of various characteristics, such as repetitive use in floating point or graphics calculations. To make the best use of such caches, it is often desirable to load (or fetch) the requisite data prior to its being needed. In this manner, data that is likely to be needed in the future can be loaded while other operations are performed. This technique is known as data prefetching.

As can be seen, modulo scheduling and data prefetching are complimentary techniques. Modulo scheduling maximizes instruction-level parallelism by making efficient use of multiple pipelines, and data prefetching is an efficient way to make data available at the high data rates mandated by superscalar architectures. Thus, it is desirable to employ both techniques to maximize performance.

One approach to combining data prefetches and modulo-scheduling would be to first unroll the loop body and then simply precede the unrolled body in toto with the requisite data prefetch instructions. In such a case, the entire loop body is unrolled a certain number of times, and the requisite number of prefetches inserted prior to scheduling the loop.

Unfortunately, this is a simplistic solution to a complex problem. In effect, this approach yields a very large loop, resulting in the generation of cumbersome assembly code that would fail to make efficient use of a superscalar processor's resources (e.g., the schedule obtained for the larger loop body can be poor, causing stalls in one or more of the pipelines). Moreover, the resulting assembly code would be inefficient with respect to simply unrolling the loop in question, without the data prefetches, because data fetches in the loop would at least load the requisite data at the proper time (i.e., the problem of data wait stalls would not be encountered).

Thus, it is desirable to effectively and efficiently marry the technique of modulo scheduling with data prefetching in order to increase instruction level parallelism while effectively using data prefetching to maintain efficient use of cache memory and data throughput. Preferably, such a technique should not require major modifications to present compiler technology to effect support of such capabilities. Further, the number of data prefetches should be minimized to maximize the efficiency with which the architecture's memory hierarchy is utilized.

SUMMARY OF THE INVENTION

The present invention solves the problems associated with the prior art by efficiently and effectively marrying modulo scheduling techniques with data prefetching techniques. The present invention does so by taking into consideration parameters related to the pending insertion of prefetch instructions in the code generated by modulo scheduling. Subsequently, prefetch instructions are inserted at even intervals in the assembly code generated. This allows the assembly code generated to maximize the efficiency with which a loop is executed. The insertion of prefetch instructions by the present invention is performed in a manner which minimizes spills and reloads, thus maximizing the efficiency with which the architecture's resources are utilized.

According to one aspect of the present invention, a computer-implemented method for compiling source code, having a loop therein, into output code is disclosed. The method begins by calculating a prefetch-based kernel unroll factor for the loop. This entails calculating a prefetch-based unroll factor for the loop, calculating a kernel unroll factor for the loop, and calculating the prefetch-based kernel unroll factor by adjusting the kernel unroll factor using the prefetch-based unroll factor. Next, the output code is generated. Finally, one or more prefetch instructions are inserted into the output code. This entails determining a prefetch ordering, inserting a group of prefetch instructions into the output code, and determining an address displacement for at least one prefetch instruction in the group of prefetch instructions. It is expected that the group of instructions includes at least one prefetch instruction.

A further understanding of the nature and advantages of the present invention may be realized by reference to the remaining portions of the specification and the drawings.

DETAILED DESCRIPTION

The modulo scheduler of the present invention begins with a single copy of a loop, schedules it, then unrolls that loop according to a kernel unroll factor, thus generating assembly code consisting of three phases: the prologue, the kernel, and the epilogue. With regard to improving performance, the kernel is of greatest interest because it is expected that most of the execution time will be spent executing this portion of the code. In a modulo scheduler according to the present invention, the kernel unroll factor (KUF; the number of times the kernel is unrolled) is based on four factors:

(1) The lifetime of the variables generated in the loop;
(2) a constraint imposed by the desire to amortize overhead instructions;
(3) a constraint imposed by certain parameters of the target machine; and
(4) a constraint imposed by the need to prefetch data, preferably in an optimal manner.

The fourth constraint is added to the determination of the KUF by the present invention in a manner that simplifies the subsequent addition of data prefetches to the assembly code generated by the modulo scheduler. According to the present invention, these data prefetches are added to the code generated by the modulo scheduler in a postpass phase.

It should be noted that while the embodiment of the present invention described herein employs certain fixed values (e.g., inserting prefetches in groups of 2 or 3), such values are provided only as examples, for simplicity of description. It will be understood by one of skill in the art that these values can readily be parameterized or altered as suits the application at hand.

Figure 1:
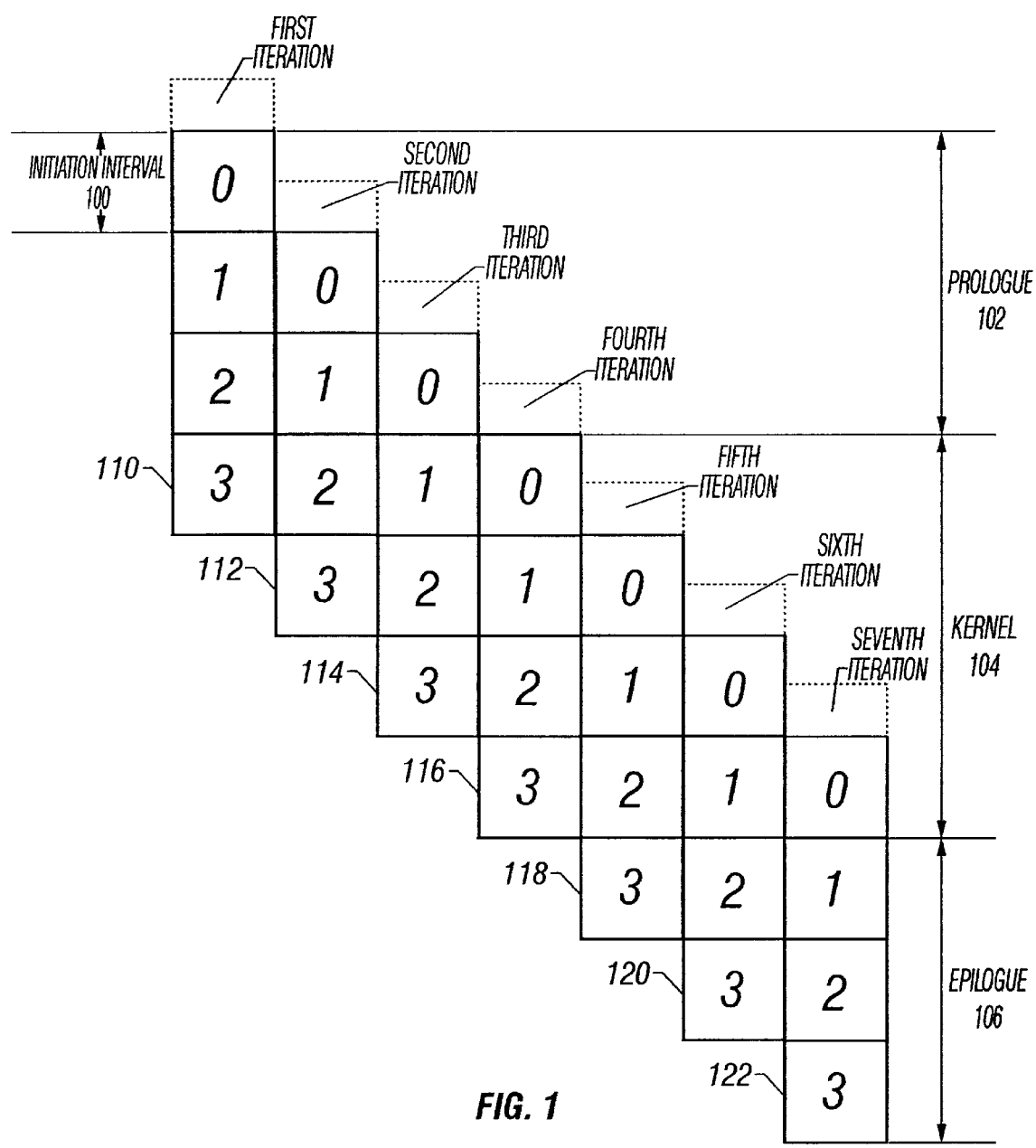
FIG. 1 is a diagram showing the execution of seven iterations of a pipelined loop as scheduled for execution by a compiler having modulo scheduling capabilities.
Figure 2:
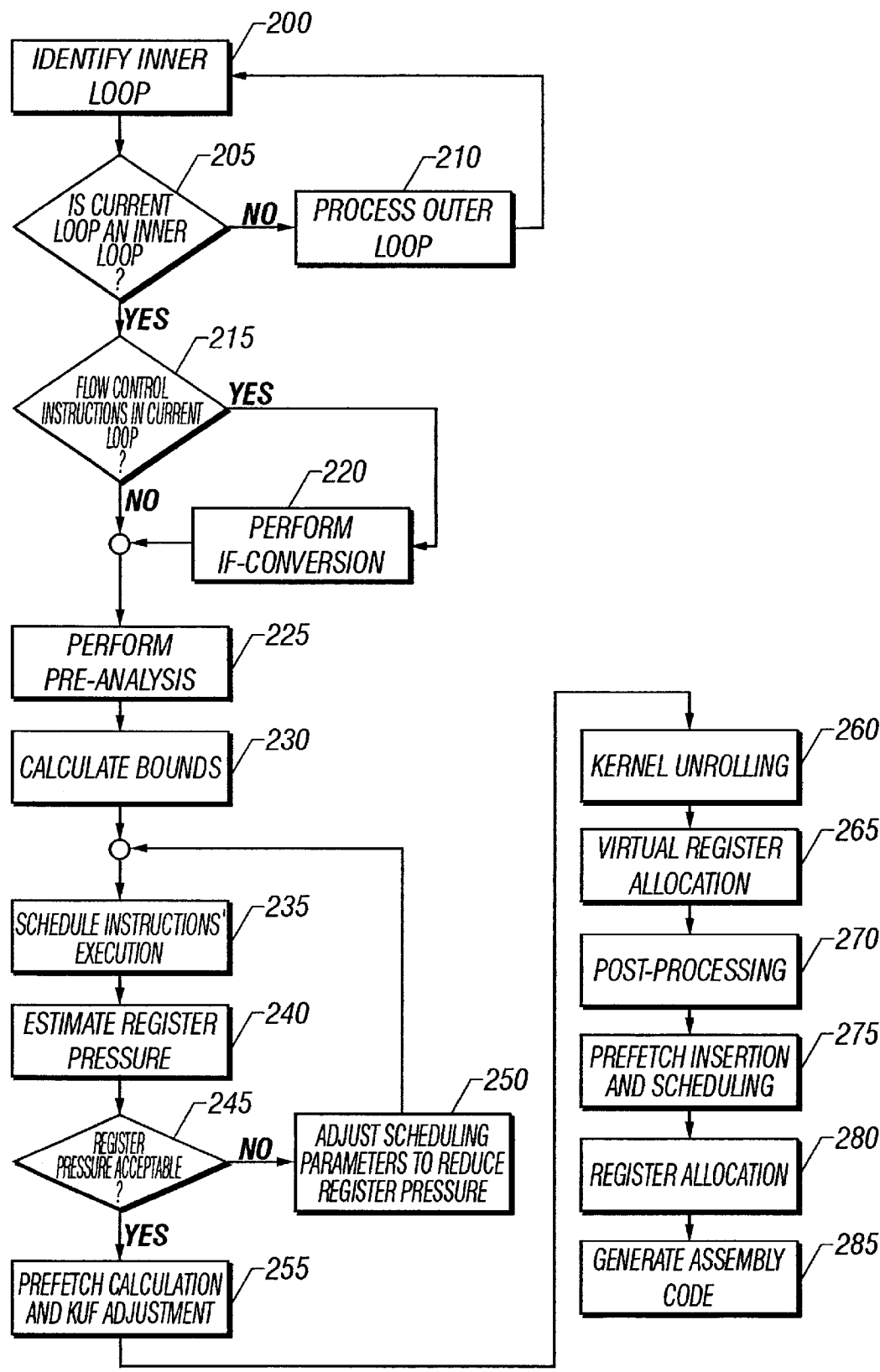
FIG. 2 is a flow diagram showing the operation of a compiler using modulo scheduling and postpass prefetch insertion according to the present invention.

FIG. 2 illustrates the steps taken in compiling software using a modulo scheduler of the present invention. First, inner loops are identified at step 200. Inner loops are loops, such as FOR-loops and DO-loops, in which no sub-loops exist. This determination is made at step 205, where it is determined whether or not the current loop contains inner loops. If the current loop is not an inner loop, it is deemed an outer loop and is further processed to identify inner loops contained therein (step 210). If the current loop is an inner loop, the process proceeds to step 215, at which point it is determined whether the current loop contains any flow control instructions. Such flow control instructions include branch instructions, goto statements, and the like. If flow control instructions exist in the current loop, a process known as IF-conversion is performed (step 220).

IF-conversion converts loop bodies containing flow control statements into a single block. This technique removes the branches from the loop and attaches predicates to instructions from the two sides of the branch. The block is then scheduled as usual. Certain processors, however, are constrained by their instruction sets in that they offer limited support for IF-conversion. This might be due, for example, to the processor's supporting only a limited number of condition codes. Under such constraints, only a limited solution is possible.

For example, in a processor with a limited number of condition codes, loops with limited control flow are IF-converted into a single basic block. The fact that condition codes cannot be spilled like normal data requires that a schedule be derived that will definitely not need more than the maximum number of condition codes supported by the processor.

To handle this problem, the loop's dependence graph is first constrained by drawing some additional arcs. These additional arcs ensure that the schedule derived will not need more condition codes than are available. For example, an implicit arc with $\Omega=4$ from the last use of a compare's result to the next instance of that compare would constrain the scheduler to generate a schedule that uses no more than four condition codes for this compare. After scheduling, physical condition code registers are then assigned to the compares and propagated to the uses. This function is similar to that of a register allocator but is done within the modulo scheduler for this special case. The normal register allocator handles all other data values which it can spill/reload if it chooses to do so.

If there are no flow control instructions in the current loop or if such flow control instructions are successfully IF-converted, pre-analysis of the current loop is performed at step 225. This pre-analysis includes various optimizations such as variant hoisting, load elimination, move elimination, and so on. Next, bounds are calculated at step 230. The bounds so calculated include the MII and RMII, as previously described. At step 235, the loop is scheduled. This step also involves generating the data dependency graph (DDG) and calculating the required KUF. At step 240, after scheduling, register pressure is estimated by computing the number of simultaneously live loop variants and adding the number of invariants. Register pressure indicates the number of registers needed to efficiently execute a given section of code versus the number of registers actually available in the given processor's architecture. This is normally done for each class of data values: integer, single and double precision floating point. These estimates are actually lower bounds on the number of registers needed.

At step 245 this estimated register pressure is analyzed to determine if such register pressures are acceptable. Normally the scheduler will try aggressively to derive the best schedule without regard to register pressure. However, scheduler attempts made after the register pressure exceeds an acceptable value must be less aggressive; scheduling parameters are varied to reduce the register pressure, in that case. For example, the II may be raised or the load latency reduced to reduce register pressure. Either change is likely to result in lower register pressure. Several attempts are made to find a schedule for which the lower bounds are less than the set register pressure thresholds. (If all these attempts prove unsuccessful, the loop may simply be unrolled a few times and left at that.)

Higher instruction level parallelism usually comes with high register pressure. One reason for this is that n instructions, each with a latency of m cycles can result in nm instructions "in flight" (at some point in their execution within a pipeline) and so requiring nm registers into which results may be deposited. Modulo scheduling extracts a good deal of ILP from a given section of code and is, therefore, particularly susceptible to this problem. While strategies for register allocation in modulo scheduled loops and controlling the register pressure have been proposed, reloads within the modulo schedule are particularly difficult to handle because these loads are naturally placed very close to the operation requiring the reloaded value. This minimal spacing immediately introduces a series of bubbles into the pipeline that has been so carefully scheduled by the scheduler. Moreover, store-load pairs can generate substantial read-after-write (RAW) penalties, depending on the processor's architecture. For this reason, even a few spills and reloads can substantially reduce the schedule's performance.

Avoiding spills and reloads requires two items. First, problem situations must be recognized. This is done by estimating the register pressure after scheduling, as noted above with regard to step 240. Second, mechanisms must be provided to take suitable action(s) after a problem situation has been recognized. If the bounds exceed the thresholds specified for each data type (i.e., the estimated register pressure is unacceptable), then the schedule should be discarded and a new one derived. These thresholds are usually just one or two less than the number of physical registers available. Scheduling parameters are then adjusted to reduce the register pressure to acceptable levels (step 250) and the loop is rescheduled. If the estimated register pressure is acceptable, the process proceeds to step 255, at which point prefetch calculations are performed and the KUF adjusted. This step is described in greater detail with regard to FIG. 3.

Next, at step 260, the loop's kernel is unrolled in accordance with the adjusted KUF calculated previously. As noted, this unrolling takes the form of replicating the loop kernel a given number of times. Once the kernel has been unrolled, virtual register allocation is performed at step 265. Virtual register allocation allocates variables to one of several virtual registers. These virtual registers represent storage locations that do not actually exist, and so must be mapped to physical registers, which is done later.

At step 270, post-processing is performed. Post-processing is a phase wherein various special behaviors or constraints of the target machine are imposed on the code. An example would be a machine that is capable of issuing up to four instructions per cycle, under the constraint that the fourth instruction must be a floating point instruction. The scheduler might generate code (previous steps) without worrying about such a constraint. Then during post-processing, the constraint is imposed by examining groups with four instructions and moving the floating point instruction to the fourth position if it is not already there. The post processing phase attempts to identify such target-machine constraints, making minor adjustments to the code generated from previous steps. At step 275, the scheduling and insertion of prefetch instructions is performed. The steps performed in prefetch insertion and scheduling are further detailed in FIG. 4, which is described below.

Next, the virtual registers allocated at step 265 are allocated to physical registers at step 280. Code processed in the compiler prior to register allocation manipulates logical values. The computation specified by the source program must be correctly represented by the code (instructions executable by the target processor) executing with the logical values. If the instructions are rearranged, the logical values have to be adjusted to preserve correctness. Finally, physical register allocation assigns physical registers (registers in the target processor) to each of these logical values.

A simple example highlights the foregoing concepts. Original code:

| ld p,t   | // load from address p into logical val t |
|----------|-------------------------------------------|
| add t,2,t | // add t and 2 and put into logical val t |
| st p,t   | // store logical val t into address q     |
| ld q,t   | // load from address p into logical bal t |
| add t,2,t | // add t and 2 and put into logical val t |
| st p,t   | // store logical val t into address q     |

The computation represented above adds 2 to the values stored at addresses p and q. In computers using current technology, it is common for a load to take some time. Thus, a scheduler may attempt to rearrange the above code by doing the two loads, then the two adds, and, finally, the two stores, creating the following code (post-scheduling):

ld p,t
ld q,t
add t,2,t
add t,2,t
st p,1
st q,t

Clearly, the logical values in the scheduled code have to be reallocated. After reallocating the logical values:

ld p,t
ld q,u

```
add t,2,t
add u,2,u
st p,t
st q,u
```
The code above continues to use logical values t and u. These are finally assigned to physical registers in the machine (e.g., r1 and r2). Thus, after physical register allocation, the code becomes:
```
ld p,r1
ld q,r2
add r1,2,r1
add r2,2,r2
st p,r1
st q,r1
```
These virtual and physical allocations are performed in steps 265 and 280 respectively. Finally, at step 285, the actual assembly code is generated by the compiler.

Figure 3:
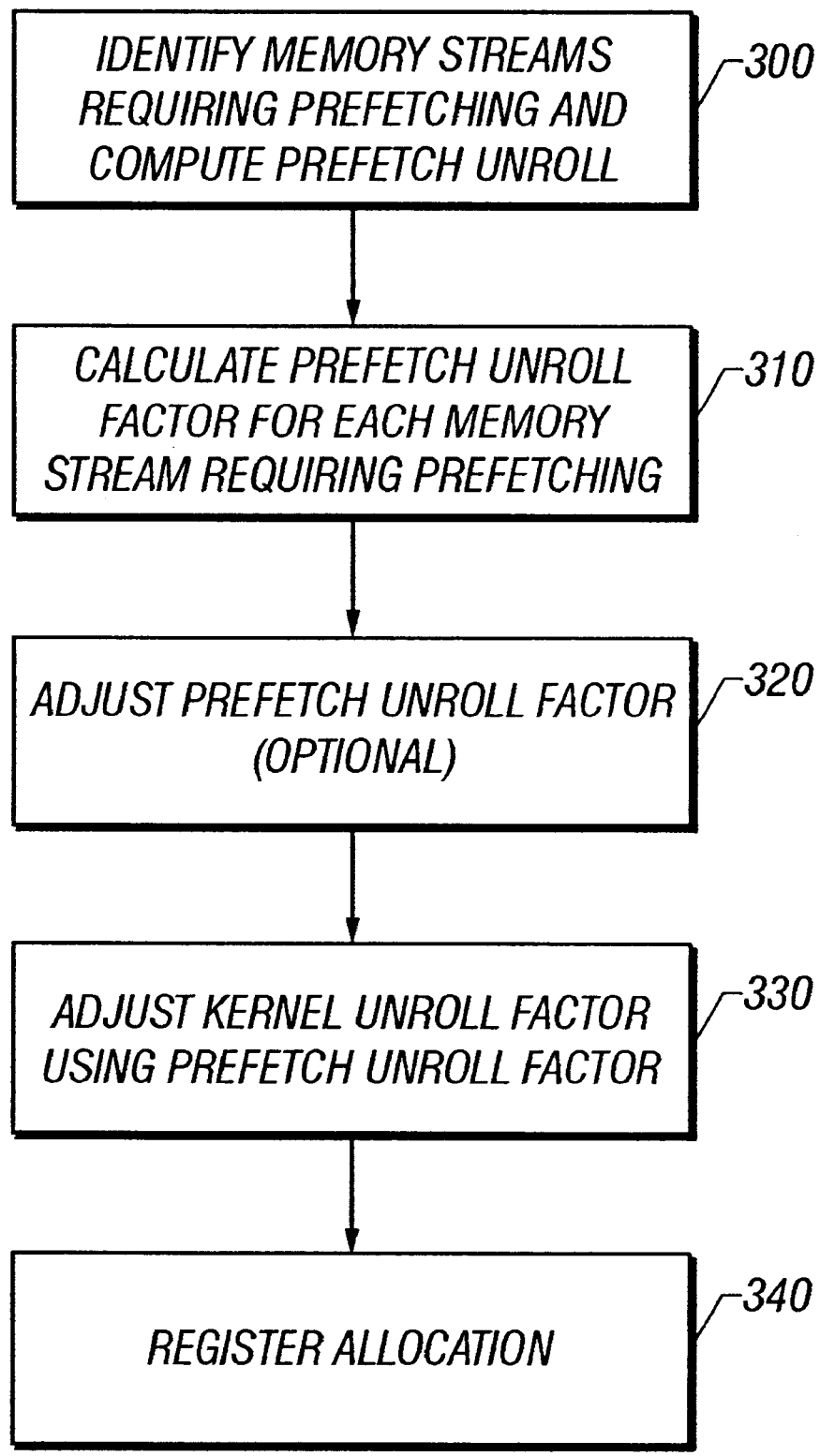
FIG. 3 is a flow diagram showing prefetch calculation and KUF adjustment in a compiler according to the present invention.

FIG. 3 illustrates certain of the actions performed in the present invention during step 255 of the flow diagram of FIG. 2. During this step, prefetch calculation and KUF adjustment are performed. Prefetch calculation and KUF adjustment include the following steps. First, the scheduler of the present invention identifies memory streams requiring prefetching, and computes the prefetch unroll for each such memory stream (step 300).

The goal of data prefetching is to by ensure that data for a given section of code (e.g., one iteration of a loop) has prefetches executed that provide all the data required for the execution of that section of code. Prefetches are normally performed such that entire cache lines are read into the cache. The number of prefetches needed is determined by the stride. Normally, a cache line contains more than one byte of data. That being the case, not every byte of the cache line may be needed. In the worst case, the cache line contains only one byte of the data that is desired. This is the leas t efficient case. Alternatively, it is possible that every byte of the cache line is needed, which is the most efficient case.

The number of bytes in the cache line divided by the number of bytes of data desired is the stride. For example, if the cache line is 64 bytes long, and only every eighth byte is needed, the stride is 8 bytes. If every fourth byte is needed, the stride is 4 bytes. The variables which may be needed in a loop may have different strides. For example, different array variables may easily be indexed in different ways within a loop. Such variables are likely to have different strides. What is therefore necessary is to match the prefetches for each of the variables to one another so that they may be loaded in an efficient manner.

Using the previous example, the first variable might be an array of byte values accessed at every eighth entry, while the second variable might be an array of byte values accessed at every fourth entry. Because it is desirable to minimize the number of prefetches performed, the number of prefetches performed for each variable should be evenly matched. Thus, if equal numbers of the first and second arrays' elements were to be loaded in the present example, one prefetch of the second variable's elements would be required for every two of the first variable's elements. If all such variables in a loop are so analyzed, a least common multiple may be calculated. In the present example, if the cache line size is 8 bytes long, the least common multiple would be two. This also indicates that it would take two loop iterations to consume the data from one prefetch of the second variable. Providing data for the first variable would require two prefetches. This is the prefetched-based loop unroll factor, and indicates the number of iterations that should be unrolled to permit the most efficient prefetching of data.

Consider the case in which information on stride is available (when not available, a default value may be assumed). If the cache line size is $l_c$ bytes, and the element size and stride of memory stream i are $e_i$ and $s_i$, respectively, then the prefetch unroll $p_i$ for stream i may be calculated as:

$$p_i = \text{MAX}\left(\left\lfloor \frac{l_c}{s_i \cdot e_i} \right\rfloor, 1\right) \quad (5)$$

Next, the prefetch-based unroll factor ($U_p$) for the loop is computed at step 310. This is computed as the least common multiple (LCM) of the prefetch unroll for each prefetched memory stream:

$$U_p = \text{LCM}(p_i) \quad (6)$$

where $U_p$ is the prefetch-based unroll factor for the loop and $p_i$ is the prefetch unroll for stream i. At step 320, if necessary, the prefetch-based unroll factor is adjusted to account for special cases to limit code size expansion.

For example, it may be desirable to limit the prefetch-based unroll factor to a value of 16 or less. This might be done, for example, so that the code does not require too much space in the instruction cache (i.e., to limit the code expansion that might otherwise result). Alternatively, the prefetch-based unroll factor may have to be increased if it is unacceptably low. These adjustments and calculations may be further guided by special command line options/directives (e.g., assume unit stride if stride is unknown; using a user-selected stride; assume large stride when unknown; limit prefetch unroll to no more than eight, and so on).

The KUF for the loop is then adjusted at step 330 using the adjusted prefetch-based unroll factor. After a KUF for the loop is obtained using the usual factors (factors 1–3 described earlier), the KUF is adjusted to account for the adjusted prefetch-based unroll factor. This is preferably done using the following paradigm:

if ($U_p \geq$ KUF),
  then KUF=$U_p$;
  else KUF=KUF+$U_p$−(KUF mod $U_p$)

where KUF is the kernel unroll factor and $U_p$ is the prefetch-based unroll factor. This adjustment converts the KUF into an integer multiple, k, of $U_p$. The variable k is referred to herein as the prefetch-based unroll multiple. The assembly code is then generated with the adjusted KUF, as shown in steps 260–270 of FIG. 2.

Figure 4:
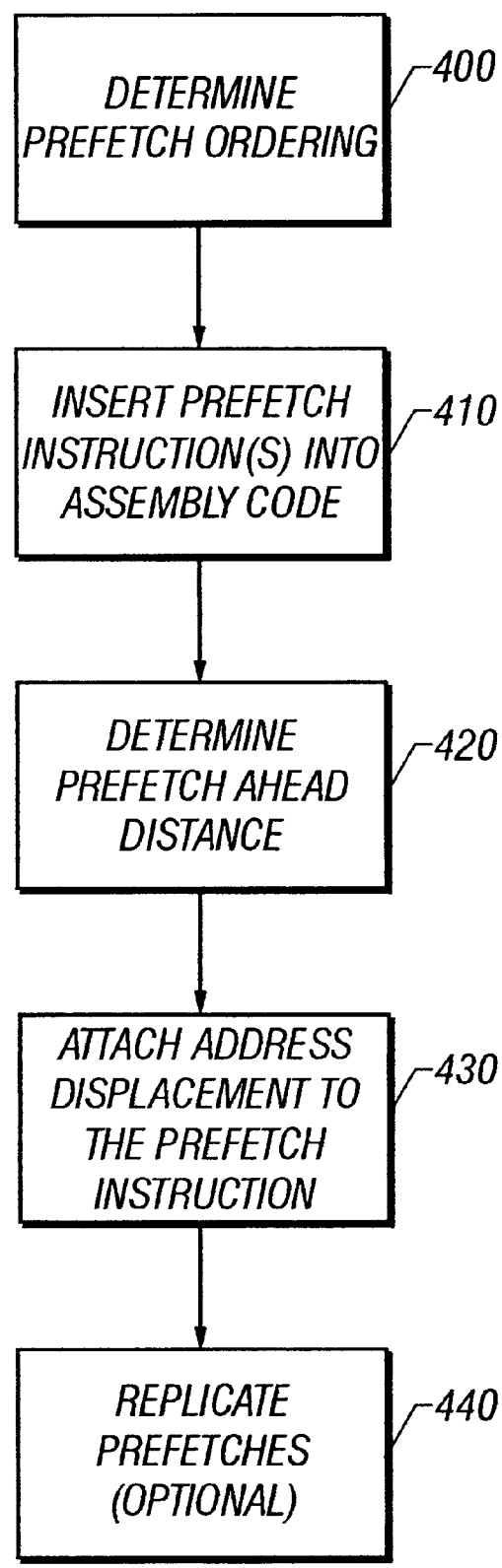
FIG. 4 is a flow diagram showing prefetch insertion and scheduling in a compiler according to the present invention.

FIG. 4 illustrates certain of the actions performed in the present invention during step 275 of the flow diagram of FIG. 2. During this step, prefetch insertion and scheduling are performed. Prefetch insertion and scheduling include the following steps. First, prefetch ordering is determined at step 400. Assume:

$$\text{KUF}_{Adjusted} = k^* U_p \quad (7)$$

where $\text{KUF}_{Adjusted}$ is the kernel unroll factor, adjusted to account for $U_p$ (the prefetch-based unroll factor), and k is the prefetch-based unroll multiple. The prefetches are preferably ordered in the same order in which the corresponding memory stream operations appear in the kernel. Alternatively, prefetches for loads could be given priority over prefetches for stores, resulting in an attempt to launch requests for input data early. The number of prefetches inserted for $U_p$ copies of the kernel is:

$$U_p \cdot \sum \frac{1}{p_i} \quad (8)$$

where $U_p$ is the prefetch-based unroll factor and $p_i$ is the prefetch unroll for stream i.

Prefetches are then inserted in groups. These groups preferably include three prefetches, although pairs of prefetches may be needed for groups of store instructions. Other groupings, or even variable groupings may also be employed. These groups are evenly spaced out over $II^*U_p$ machine cycles. Prefetches are placed before the first instruction in the group nearest the even spacing point for that group. However, branch delay slot problems may occur, although such problems are unlikely. Normally, inserting prefetches into the code does not affect it's correctness. This is so because prefetch instructions only attempt to move data closer to the processor in preparation for computation; they do not interfere with the actual computation. Many modern processors have a feature called delayed branching. This feature allows the processor to execute on instruction after a branch instruction before the effect of the branch becomes visible. Thus:

```
  ...
  branch    // add instruction is executed even if
  add       // the branch is taken
```

It can be seen that inserting a prefetch between the branch and the branch delay slot instruction (the add instruction) can lead to problems. If a prefetch were so inserted, the add instruction would be guaranteed to execute. If the branch is taken, the delay slot instruction (now the prefetch) would be executed, but not the add instruction. Thus the prefetch in this case should be inserted before the branch, and not after it.

The number of groups and their spacing are:

$$n_g = \left| \frac{1}{3} \cdot U_p \cdot \sum \frac{1}{p_i} \right| \quad (9)$$

$$S = \frac{II \cdot U_p}{n_g} \quad (10)$$

where $n_g$ is the number of groups, $U_p$ is the prefetch-based unroll factor, $p_i$ is the prefetch unroll, S is the spacing between the groups, and II is the iteration interval. Next the prefetch ahead distance is determined. The prefetch ahead distance d is computed as the smallest value that satisfies:

$$II \cdot U_p \cdot k \cdot (d-1) > L \quad (11)$$

where L is an experimentally determined limit. L is a factor that is related to the latency and bandwidth and related characteristics. For example, an L value of 40 has proved acceptable. Because L is obtained through experimentation, its value is best kept parameterized (although a value of 40 is a good approximation of its preferred value).

The address displacement is then attached to the prefetch. Consider the prefetch for a memory stream operation which uses an address A, and has a stride s, and an element size e. The address here is assumed to be in the form reg+imm (i.e., a register-immediate addressing scheme). If this is not the case, the adjustment may require the use of a new register for the prefetch. This could increase register pressure if such registers were used for all the prefetches. However, in most cases addresses are already in the form reg+imm. Thus, increased register pressure is normally avoided. The following address formula is used for the prefetch:

$$A_{Address} = A + d \cdot k \cdot U_p \cdot s \cdot e \quad (12)$$

where $A_{Address}$ is the address to be used as the address from which the data is to be prefetched, d is the prefetch ahead distance, k is prefetch-based unroll multiple and $U_p$ is the prefetch-based unroll factor.

Finally, prefetches are replicated for all k copies in the entire unrolled kernel. This is done by repeating steps 420 and 430 (k−1) times, unless k is equal to 1, in which case no replication is required, although the address to use ($A_{Address}$) may be different.

A Programming Example Using the Present Invention

As a simple example of the method of the present invention, consider the following loop.

```
subroutine example (u, v, x, y)
real*8 u(1), v(1), x(1), y(1)
        do i=1, 100000
            u(2*i − 1) = v(i) + 2.5
            y(4*i − 3) = x(i) * 2.5
        end do
        return
    end
```

In this example, it will be assumed that a machine with the following basic characteristics is being targeted.

TABLE 1

Basic characteristics of the target machine

| Operation class | Latency | Max issue/clock |
|---|---|---|
| Memory | 8 (for loads) | 1 |
| Floating point | 3 | 1 add, 1 mul |
| Integer ALU | 1 | 2 |

It will also be assumed that a maximum of 4 instructions can be dispatched together and that the cache line size is 64 bytes. With respect to this example, the description in the preceding section may be applied as follows.

First, the prefetch unroll for each memory stream that needs prefetch is identified. In this example, there are four memory streams for v, x, u, and y. The first two memory streams are loaded and the last two are stored. Table 2 shows the calculation of the prefetch unroll for the streams.

TABLE 2

Prefetch unroll calculations (cache line = 64 bytes)

| Number | Stream | Stride | Element Size | Prefetch Unroll |
|---|---|---|---|---|
| 1 | v | 1 | 8 | 8 |
| 2 | x | 1 | 8 | 8 |
| 3 | u | 2 | 8 | 4 |
| 4 | y | 4 | 8 | 2 |

Next, the prefetch-based unroll factor for the loop is computed: $U_p$=LCM(2,4,8)=8. In this case, the value of $U_p$ is limited to no more than 16: $U_p$=MIN($U_p$, 16)=8. The loop is then scheduled using the modulo scheduling scheme described previously. This example is limited by the four memory operations. It achieves an II of 4, as well as having the MII equal to the II. The KUF is calculated to be 3.

Next, the KUF for the loop is adjusted. Since the current KUF of 3 is less than the $U_p$ of 8 from step 3, the KUF is adjusted to be equal to the $U_p$ (i.e., the current KUF is set equal to 8).

Assembly code is then generated with a KUF of 8 (as noted above). For this example, code in the kernel as generated with a KUF of 8 following the modulo scheduling scheme described in the same reference might appear as follows:

| Instruction | | Scheduled Time |
|---|---|---|
| Kernel: | | |
| ldd | [%13], %f8 | 1 |
| add | %i0, 8, %10 | 1 |
| add | %14, 256, %14 | 1 |
| faddd | %f6, %f12, %f6 | 1 |
| std | %f6, [%12–8] | 2 |
| cmp | %i0, %16 | 2 |
| add | %15, 64, %15 | 2 |
| ldd | [%15–64], %f16 | 3 |
| add | %13, 64, %13 | 3 |
| add | %12, 128, %12 | 3 |
| fmuld | %f2, %f12, %f2 | 3 |
| std | %f2, [%14–280] | 4 |
| ldd | [%13–56], %f6 | 5 |
| faddd | %f4, %f12, %f2 | 5 |
| std | %f2, [%12–120] | 6 |
| ldd | [%15–56], %f14 | 7 |
| fmuld | %f0, %f12, %f0 | 7 |
| std | %f0, [%14–248] | 8 |
| ldd | [%13–48], %f4 | 9 |
| faddd | %f8, %f12, %f0 | 9 |
| std | %f0, [%12–104] | 10 |
| ldd | [%15–48], %f8 | 11 |
| fmuld | %f16, %f12, %f0 | 11 |
| std | %f0, [%14–216] | 12 |
| ldd | [%13–40], %f12 | 13 |
| faddd | %f6, %f12, %f0 | 13 |
| std | %f0, [12–88] | 14 |
| ldd | [%15–40], %f6 | 15 |
| fmuld | %f14, %f12, %f0 | 15 |
| std | %f0, [%14–184] | 16 |
| ldd | [%13–32], %f0 | 17 |
| faddd | %f4, %f12, %f4 | 17 |
| std | %f4, [%12–72] | 18 |
| ldd | [%15–32], %f4 | 19 |
| fmuld | %f8, %f12, %f8 | 19 |
| std | %f8, [%14–152] | 20 |
| ldd | [%13–24], %f14 | 21 |
| faddd | %f2, %f12, %f2 | 21 |

-continued

| Instruction | | Scheduled Time |
|---|---|---|
| std | %f2, [%12–56] | 22 |
| ldd | [%15–24], %f8 | 23 |
| fmuld | %f6, %f12, %f2 | 23 |
| std | %f2, [14–120] | 24 |
| ldd | [%13–16], %f6 | 25 |
| faddd | %f0, %f12, %f0 | 25 |
| std | %f0, [%12–40] | 26 |
| ldd | [%15–16], %f2 | 27 |
| fmuld | %f4, %f12, %f0 | 27 |
| std | %f0, [%14–88] | 28 |
| ldd | [%13–8], %f4 | 29 |
| faddd | %f14, %f12, %f0 | 29 |
| std | %f0, [%12–24] | 30 |
| ldd | [%15–8], %f0 | 31 |
| fmuld | %f8, %f12, %f8 | 31 |
| ble | pt%icc, kernel | 32 |
| std | %f8, [%14–56] | 32 |

Next, prefetch ordering is determined. In this example, the kernel unroll factor (KUF) and the prefetch-based unroll factor ($U_p$) are both equal to 8. Therefore, the prefetch unroll multiple (k) is equal to 1 in this example. The number of prefetches to be inserted in this example is 8*(⅛+⅛+¼+½)=8. Next, these prefetches are inserted. Suppose, for example, that we choose to insert prefetches in groups of 2 for this machine. Since 8 prefetches have to be inserted, there will be 4 groups of prefetches. The scheduled length of the kernel is:

$$II \cdot U_p = 4 \cdot 8 = \quad (13)$$

(the variables retaining the meaning ascribed to them previously). The spacing will be 32/4=8. The four groups of prefetches will be inserted before the groups at scheduled cycles of 1, 9, 17, and 25.

The prefetch ahead distance is then determined. This is an empirical calculation which may require adjustment depending on the characteristics of the target machine's memory system. The goal is to ensure that prefetches are issued with sufficient frequency, but not too far in advance for the derived schedule. Using the suggested inequality above yields, 4*8*1*(d−1)>40, or a d value of 3.

Next, address displacements are attached to the prefetch instructions. For this example, the address displacements from the address of the target memory operations are calculated as in the table below. Address displacements are added to the prefetch instructions noting any intervening address modifications (between the prefetch in question and the load/store being targeted by that prefetch).

TABLE 3

Address displacement calculations for each stream

| No. | Stream | d | k | $U_p$ | s | e | Disp |
|---|---|---|---|---|---|---|---|
| 1 | v | 3 | 1 | 8 | 1 | 8 | 192 |
| 2 | x | 3 | 1 | 8 | 1 | 8 | 192 |
| 3 | u | 3 | 1 | 8 | 2 | 8 | 384 |
| 4 | y | 3 | 1 | 8 | 4 | 8 | 768 |

The prefetches are then replicated, if necessary. In this example, k=1, and so no replication is required. The final assembly code appears as follows:

| Instruction | Time | Comment (stream, target mem op for reference and intervening address changing op if any) |
|---|---|---|
| Kernel: | | |
| prefetch [%13 + 192], 0 | | For v; tgt ldd@t = 1 |
| prefetch [%15 + 192], 0 | | For x; tgt ldd@t = 3; incr @t = 2 |
| ldd[%13], %f8 | 1 | |
| add%i0, 8, %i0 | 1 | |
| add%14, 256, %14 | 1 | |
| faddd%f6, %f12, %f6 | 1 | |
| std%f6, [12 − 8] | 2 | |
| cmp%i0, %16 | 2 | |
| add%15, 64, %15 | 2 | |
| ldd[15 − 64], %f16 | 3 | |
| add%13, 64, %13 | 3 | |
| add%12, 128, %12 | 3 | |
| fmuld%f2, %f12, %f2 | 3 | |
| std%f2, [%14 − 280] | 4 | |
| ldd[%13 − 56], %f6 | 5 | |
| faddd%f4, %f12, %f2 | 5 | |
| std%f2, [%12 − 120] | 6 | |
| ldd[%15 − 56], %f14 | 7 | |
| fmuld%f0, %f12, %f0 | 7 | |
| std%f0, [%14 − 248] | 8 | |
| prefetch [%12 + 248], 2 | | For u; tgt std@t = 2; incr @t = 3 |
| prefetch [%12 + 312], 2 | | For u; tgt std@t = 18 |
| ldd[%13 − 48], %f4 | 9 | |
| faddd%f8, %f12, %f0 | 9 | |
| std%f0, [%12 − 104] | 10 | |
| ldd[%15 − 48], %f8 | 11 | |
| fmuld%f16, %f12, %f0 | 11 | |
| std%f0, [%14 − 216] | 12 | |
| ldd[%13 − 40], %f2 | 13 | |
| faddd%f6, %f12, %f0 | 13 | |
| std%f0, [%12 − 88] | 14 | |
| ldd[%15 − 40], %f6 | 15 | |
| fmuld%f14, %f12, %f0 | 15 | |
| std%f0, [%14 − 184] | 16 | |
| prefetch[%14 + 488], 2 | | For y; tgt std@t = 4 |
| prefetch[%14 + 552], 2 | | For y; tgt std@t = 12 |
| idd[%13 − 32], %f0 | 17 | |
| faddd%f4, %f12, %f4 | 17 | |
| std%f4, [%12 − 72] | 18 | |
| ldd[%15 − 32], %f4 | 19 | |
| fmuld%f8, %f12, %f8 | 19 | |
| std%f8, [%14 − 152] | 20 | |
| ldd[%13 − 24], %F14 | 21 | |
| faddd%f2, %f12, %f2 | 21 | |
| std%f2, [%12 − 56] | 22 | |
| ldd[%15 − 24], %f8 | 23 | |
| fmuld%f6, %f12, %f2 | 23 | |
| std%f2, [%14 − 120] | 24 | |
| prefetch{%14 + 616], 2 | | For y; tgt std@t = 20 |
| prefetch[%14 + 680], 2 | | For y; tgt std@t = 28 |
| ldd[%13 − 16], %f6 | 25 | |
| faddd%f0, %f12, f0 | 25 | |
| std%f0, [%12 − 40] | 26 | |
| ldd[%15 − 16], %f2 | 27 | |
| fmuld%f4, %f12, %f0 | 27 | |
| std%f0, [%14 − 88] | 28 | |
| ldd[%13 − 8], %f4 | 29 | |
| faddd%f14, %f12, %f6 | 29 | |
| std%f0, [%12 − 24] | 30 | |
| ldd[%15 − 8], %f0 | 31 | |
| fmuld%f8, %f12, %f8 | 31 | |
| ble, pt%icc, kernel | 32 | |
| std%f8, [%14 − 56] | 32 | |

It should be noted that in this example, registers are shown as having been allocated. In practice, the analysis, adjustments, and prefetch insertions occur with values allocated to logical registers (also referred to as virtual registers). Subsequently, register allocation routines allocate physical registers to the logical registers used.

By using the method of the present invention, a compiler of the present invention effectively and efficiently marries the techniques of modulo scheduling and data prefetching in order to increase instruction level parallelism while maintaining the efficient use of cache memory and improving throughput. Moreover, the present invention does not require major modifications to present compiler technology to effect support of such capabilities. Further, the present invention minimizes the number of data prefetches, thus maximizing efficient utilization of the memory hierarchy.

Having fully described the preferred embodiments of the present invention, many other equivalent or alternative methods of implementing instruction issue decoupling according to the present invention will be apparent to those skilled in the art. For example, the method of the present invention is not limited to any one architecture. Architectures capable of taking advantage of the present invention include load/store architectures (meaning that data must be loaded into a register in the register file prior to any operations being performed on it) and register/memory architectures (in which data may be operated on while still in memory). Moreover, other architectures may benefit from the present invention. Also, any number of functional units (e.g., floating point, graphics, and possibly others) could be supported by the method of the present invention. Finally, out-of-order execution might be provided for in an architecture employing the present invention. These equivalents and alternatives, and others, are intended to be included within the scope of the present invention.

What is claimed is:

1. A computer-implemented method for compiling source code into output code, said source code having a loop therein, said method comprising:
   calculating a prefetch-based unroll factor for the loop;
   calculating a kernel unroll factor for the loop;
   calculating a prefetch-based kernel unroll factor by adjusting said kernel unroll factor using said prefetch-based unroll factor;
   generating the output code using said prefetch-based kernel unroll factor to unroll the loop; and
   inserting a prefetch instruction into the output code subsequent to the generation of the output code.

2. The method of claim 1, wherein said calculating said prefetch-based unroll factor comprises:
   calculating a prefetch unroll for each one of a plurality of memory streams;
   determining said prefetch-based unroll factor by calculating a least common multiple for each one of said prefetch unroll calculated for said each one of said plurality of memory streams; and
   adjusting said prefetch-based unroll factor.

3. The method of claim 2, wherein said adjusting said prefetch-based unroll factor adjusts said prefetch-based unroll factor based on an adjustment factor, said adjustment factor being based on at least one of (1) an upper limit, (2) a lower limit, and (3) a user directive.

4. The method of claim 3, wherein said user directive is a command line option.

5. The method of claim 3, wherein said user directive is based on at least one of (1) assuming a unit stride if stride is unknown, (2) limiting prefetch unroll to a user-selected value, and (3) using a user-selected stride.

6. The method of claim 1, wherein said inserting comprises:
   determining a prefetch ordering;
   inserting a group of instructions into said output code, said group of instructions including at least one prefetch instruction; and
   determining an address displacement for said at least one prefetch instruction in said group of instructions;
   wherein said determining said prefetch ordering comprises:
   calculating a group count, said group count representing a count of a plurality of prefetch instructions in said group of instructions; and
   ordering said plurality of prefetch instructions.

7. The method of claim 1, wherein said inserting comprises:
   determining a prefetch ordering;
   inserting a group of instructions into said output code, said group of instructions including at least one prefetch instruction; and
   determining an address displacement for said at least one prefetch instruction in said group of instructions, said determining said address displacement comprising:
   calculating a prefetch ahead distance;
   calculating an address based at least in part on said prefetch ahead distance; and
   using said address as said address displacement for said at least one prefetch instruction.

8. The method of claim 1, wherein said inserting comprises:
   determining a prefetch ordering;
   inserting a group of instructions into said output code, said group of instructions including at least one prefetch instruction;
   determining an address displacement for said at least one prefetch instruction in said group of instructions; and
   repeating said inserting said group of instructions into said output code and said determining said address displacement, wherein said group of instructions is one of a plurality of such groups of instructions, said repeating placing each one of said plurality of such groups of instructions at substantially even intervals in said output code.

9. The method of claim 1, wherein said calculating said prefetch-based kernel unroll factor by adjusting said kernel unroll factor using said prefetch-based unroll factor further comprises:
   comparing said prefetch-based unroll factor to said kernel unroll factor;
   when said prefetch-based unroll factor and said kernel unroll factor are equal, calculating said prefetch-based kernel unroll factor as equal to said prefetch-based unroll factor;
   when said prefetch-based unroll factor is greater than said kernel unroll factor, calculating said prefetch-based kernel unroll factor as equal to said prefetch-based unroll factor; and
   when said prefetch-based unroll factor is less than said kernel unroll factor, calculating said prefetch-based kernel unroll factor as follows:
   adding said prefetch-based unroll factor to said kernel unroll factor to calculate a sum;
   calculating an adjustment factor as equal to said kernel unroll factor MOD said prefetch-based unroll factor; and
   subtracting said adjustment factor from said sum.

10. The method of claim 1, wherein said calculating said prefetch-based kernel unroll factor by adjusting said kernel unroll factor using said prefetch-based unroll factor comprises:
    calculating the prefetch-based kernel unroll factor as an integer multiple of the prefetch-based unroll factor.

11. The method of claim 1, wherein said calculating said prefetch-based kernel unroll factor by adjusting said kernel unroll factor using said prefetch-based unroll factor and said generating said output code minimize a number of instructions in said output code.

12. The method of claim 11, wherein said inserting said prefetch instruction into said output code includes inserting said prefetch instruction into said number of instructions.

13. A computer system comprising:
    a storage system configured to store a source code program;
    a processing system that is configured to compile said source code program into output code, said source code program having a loop therein, by virtue of being configured to:
    calculate a prefetch-based kernel unroll factor for said loop using a prefetch-based unroll factor for said loop and a kernel unroll factor for the loop by virtue of being further configured to:
    calculate said prefetch-based unroll factor for said loop;
    calculate said kernel unroll factor for said loop; and
    calculate said prefetch-based kernel unroll factor by adjusting said kernel unroll factor using said prefetch-based unroll factor;
    generate said output code using said prefetch-based kernel unroll factor to unroll the loop; and
    insert a prefetch instruction into said output code subsequent to the generation of the output code.

14. The computer system of claim 13, wherein said processing system is configured to calculate said prefetch-based unroll factor for said loop by virtue of being further configured to:
    calculate a prefetch unroll for each one of a plurality of memory streams;
    determine said prefetch-based unroll factor by calculating a least common multiple for each one of said prefetch unroll calculated for said each one of said plurality of memory streams; and
    adjust said prefetch-based unroll factor.

15. The computer system of claim 13, wherein said processing system is configured to insert said prefetch instruction into said output code by virtue of being further configured to:
    determine a prefetch ordering;
    insert a group of instructions into said output code, said group of instructions including at least one prefetch instruction; and
    determine an address displacement for said at least one prefetch instruction in said group of instructions; wherein
    said processing system is configured to determine said prefetch ordering by virtue of being further configured to:

calculate a group count, said group count representing a count of a plurality of prefetch instructions in said group of instructions; and order said plurality of prefetch instructions.

16. The computer system of claim 13, wherein said processing system is configured to insert said prefetch instruction into said output code by virtue of being further configured to:

determine a prefetch ordering;

insert a group of instructions into said output code, said group of instructions including at least one prefetch instruction; and determine an address displacement for said at least one prefetch instruction in said group of instructions by virtue of being further configured to:

calculate a prefetch ahead distance;

calculate an address based at least in part on said prefetch ahead distance; and use said address as said address displacement for said at least one prefetch instruction.

17. The computer system of claim 13, wherein said processing system is configured to calculate said prefetch-based kernel unroll factor by adjusting said kernel unroll factor using said prefetch-based unroll factor by virtue of being further configured to:

compare said prefetch-based unroll factor to said kernel unroll factor;

when said prefetch-based unroll factor and said kernel unroll factor are equal, calculate said prefetch-based kernel unroll factor as equal to said prefetch-based unroll factor;

when said prefetch-based unroll factor is greater than said kernel unroll factor, calculate said prefetch-based kernel unroll factor as equal to said prefetch-based unroll factor; and when said prefetch-based unroll factor is less than said kernel unroll factor, calculate said prefetch-based kernel unroll factor by virtue of said processing system being still further configured to:

add said prefetch-based unroll factor to said kernel unroll factor to calculate a sum;

calculate an adjustment factor as equal to said kernel unroll factor MOD said prefetch-based unroll factor; and subtract said adjustment factor from said sum.

18. The computer system of claim 13, wherein said processing system is configured to calculate said prefetch-based kernel unroll factor by adjusting said kernel unroll factor using said prefetch-based unroll factor by virtue of being further configured to:

calculate the prefetch-based kernel unroll factor as an integer multiple of the prefetch-based unroll factor.

19. The computer system of claim 13, wherein said processing system being configured to calculate said prefetch-based kernel unroll factor by adjusting said kernel unroll factor using said prefetch-based unroll factor and to generate said output code minimizes a number of instructions in said output code.

20. The computer system of claim 19, wherein said processing system is configured to insert said prefetch instruction into said output code by virtue of being further configured to:

insert said prefetch instruction into said number of instructions.

21. A computer program product for compiling a source code program into output code, said source code program having a loop therein, said product comprising:

code that calculates a prefetch-based unroll factor for the loop;

code that calculates a kernel unroll factor for the loop;

code that calculates a prefetch-based kernel unroll factor by adjusting said kernel unroll factor using said prefetch-based unroll factor;

code that generates the output code using said prefetch-based kernel unroll factor for the loop to unroll the loop;

code that inserts a prefetch instruction into the output code subsequent to the generation of the output code; and a computer-readable medium that stores said code that calculates said prefetch-based unroll factor, said code that calculates said kernel unroll factor, said code that calculates said prefetch-based kernel unroll factor, said code that generates, and said code that inserts.

22. The computer program product of claim 21, wherein said code that calculates said prefetch-based unroll factor for the loop comprises:

code that calculates a prefetch unroll for each one of a plurality of memory streams;

code that determines said prefetch-based unroll factor by calculating a least common multiple for each one of said prefetch unroll calculated for said each one of said plurality of memory streams; and code that adjusts said prefetch-based unroll factor.

23. The computer program product of claim 21, wherein said code that inserts comprises:

code that determines a prefetch ordering comprising:

code that calculates a group count, said group count representing a count of a plurality of prefetch instructions in said group of instructions; and code that orders said plurality of prefetch instructions;

code that inserts a group of instructions into said output code, said group of instructions including at least one prefetch instruction; and code that determines an address displacement for said at least one prefetch instruction in said group of instructions.

24. The computer program product of claim 21, wherein said code that inserts comprises:

code that determines a prefetch ordering;

code that inserts a group of instructions into said output code, said group of instructions including at least one prefetch instruction; and code that determines an address displacement for said at least one prefetch instruction in said group of instructions, said code that determines said address displacement comprising:

code that calculates a prefetch ahead distance;

code that calculates an address based at least in part on said prefetch ahead distance; and code that uses said address as said address displacement for said at least one prefetch instruction.

25. The computer program product of claim 21, wherein said code that calculates said prefetch-based kernel unroll factor by adjusting said kernel unroll factor using said prefetch-based unroll factor further comprises:

code that compares said prefetch-based unroll factor to said kernel unroll factor;

code that determines when said prefetch-based unroll factor and said kernel unroll factor are equal and calculates said prefetch-based kernel unroll factor as equal to said prefetch-based unroll factor;

code that determines when said prefetch-based unroll factor is greater man said kernel unroll factor and calculates said prefetch-based kernel unroll factor as equal to said prefetch-based unroll factor; and code that determines when said prefetch-based unroll factor is less than said kernel unroll factor and calculates said prefetch-based kernel unroll factor by using:
   code that adds said prefetch-based unroll factor to said kernel unroll factor to calculate a sum;
   code that calculates an adjustment factor as equal to said kernel unroll factor MOD said prefetch-based unroll factor; and
   code that subtracts said adjustment factor from said sum.

26. The computer program product of claim 21, wherein said code that calculates said prefetch-based kernel unroll factor by adjusting said kernel unroll factor using said prefetch-based unroll factor further comprises:
   code that calculates the prefetch-based kernel unroll factor as an integer multiple of the prefetch-based unroll factor.

27. The computer program product of claim 21, wherein said code that calculates said prefetch-based kernel unroll factor by adjusting said kernel unroll factor using said prefetch-based unroll factor and said code that generates said output code minimize a number of instructions in said output code.

28. The computer program product of claim 27, wherein said code that inserts said prefetch instruction into said output code includes code that inserts said prefetch instruction into said number of instructions.

29. A computer-implemented method for compiling source code into output code, said source code having a loop therein, said method comprising:
   calculating a prefetch-based kernel unroll factor for the loop;
   generating the output code using the prefetch-based kernel unroll factor for the loop to unroll the loop; and
   inserting a prefetch instruction into the output code subsequent to the generation of the output code, said inserting comprising:
      determining a prefetch ordering comprising:
         calculating a group count, said group count representing a count of a plurality of prefetch instructions in said group of instructions; and
         ordering said plurality of prefetch instructions;
      inserting a group of instructions into said output code, said group of instructions including at least one prefetch instruction; and
      determining an address displacement for said at least one prefetch instruction in said group of instructions.

30. A computer-implemented method for compiling source code into output code, said source code having a loop therein, said method comprising:
   calculating a prefetch-based kernel unroll factor for the loop;
   generating the output code using the prefetch-based kernel unroll factor for the loop to unroll the loop; and
   inserting a prefetch instruction into the output code subsequent to the generation of the output code, said inserting comprising:
      determining a prefetch ordering,
      inserting a group of instructions into said output code, said group of instructions including at least one prefetch instruction, and
      determining an address displacement for at least one prefetch instruction in said group of instructions, said determining said address displacement comprising:
         calculating a prefetch ahead distance;
         calculating an address based at least in part on said prefetch ahead distance; and
         using said address as said address displacement for said at least one prefetch instruction.

31. A computer-implemented method for compiling source code into output code, said source code having a loop therein, said method comprising:
   calculating a prefetch-based kernel unroll factor for the loop;
   generating the output code using the prefetch-based kernel unroll factor for the loop to unroll the loop; and
   inserting a prefetch instruction into the output code subsequent to the generation of the output code, said inserting comprising:
      determining a prefetch ordering;
      inserting a group of instructions into said output code, said group of instructions including at least one prefetch instruction; and
      determining an address displacement for at least one prefetch instruction in said group of instructions; and
   repeating said inserting said group of instructions into said output code and said determining said address displacement, wherein said group of instructions is one of a plurality of such groups of instructions, said repeating placing each one of said plurality of such groups of instructions at substantially even intervals in said output code.

32. A computer-implemented method for compiling source code into output code, said source code having a loop therein, said method comprising:
   calculating a prefetch-based kernel unroll factor for the loop, said calculating comprising
      calculating a prefetch-based unroll factor for the loop,
      calculating a kernel unroll factor for the loop, and
      calculating said prefetch-based kernel unroll factor by adjusting said kernel unroll factor using said prefetch-based unroll factor;
   generating the output code using said prefetch-based kernel unroll factor to unroll the loop; and
   inserting a prefetch instruction into the output code subsequent to the generation of the output code.

33. The method of claim 32, wherein said calculating said prefetch-based unroll factor comprises:
   calculating a prefetch unroll for each one of a plurality of memory streams;
   determining said prefetch-based unroll factor by calculating a least common multiple for each one of said prefetch unroll calculated for said each one of said plurality of memory streams; and
   adjusting said prefetch-based unroll factor.

34. The method of claim 33, wherein said adjusting said prefetch-based unroll factor adjusts said prefetch-based unroll factor based on an adjustment factor, said adjustment factor being based on at least one of (1) an upper limit, (2) a lower limit, and (3) a user directive.

35. The method of claim 34, wherein said user directive is a command line option.

36. The method of claim 34, wherein said user directive is based on at least one of (1) assuming a unit stride if stride is unknown, (2) limiting prefetch unroll to a user-selected value, and (3) using a user-selected stride.

37. The method of claim 32, wherein said calculating said prefetch-based kernel unroll factor by adjusting said kernel unroll factor using said prefetch-based unroll factor comprises:
   comparing said prefetch-based unroll factor to said kernel unroll factor;
   when said prefetch-based unroll factor and said kernel unroll factor are equal, calculating said prefetch-based kernel unroll factor as equal to said prefetch-based unroll factor;
   when said prefetch-based unroll factor is greater tan said kernel unroll factor, calculating said prefetch-based kernel unroll factor as equal to said prefetch-based unroll factor; and
   when said prefetch-based unroll factor is less than said kernel unroll factor, calculating said prefetch-based kernel unroll factor as follows:
      adding said prefetch-based unroll factor to said kernel unroll factor to calculate a sum;
      calculating an adjustment factor as equal to said kernel unroll factor MOD said prefetch-based unroll factor; and
      subtracting said adjustment factor from said sum.

38. The method of claim 32, wherein said calculating said prefetch-based kernel unroll factor by adjusting said kernel unroll factor using said prefetch-based unroll factor comprises:
   calculating the prefetch-based kernel unroll factor as an integer multiple of the prefetch-based unroll factor.

39. The method of claim 32, wherein said calculating said prefetch-based kernel unroll factor by adjusting said kernel unroll factor using said prefetch-based unroll factor and generating said output code minimize a number of instructions in said output code.

40. The method of claim 34, wherein said inserting said prefetch instruction into said output code further includes:
   inserting said prefetch instruction into said number of instructions.

41. A computer system comprising:
   a storage system configured to store a source code program;
   a processing system that is configured to compile said source code program into output code, said source code program having a loop therein, by virtue of being configured to:
      calculate a prefetch-based kernel unroll factor for said loop by virtue of being further configured to
         calculate a prefetch-based unroll factor for said loop,
         calculate a kernel unroll factor for said loop, and
         calculate said prefetch-based kernel unroll factor by adjusting said kernel unroll factor using said prefetch-based unroll factor;
      generate said output code using said prefetch-based kernel unroll factor to unroll the loop; and
      insert a prefetch instruction into said output code subsequent to the generation of said output code.

42. The computer system of claim 41, wherein said processing system is configured to calculate a prefetch-based unroll factor for said loop by virtue of being further configured to:
   calculate a prefetch unroll for each one of a plurality of memory streams;
   determine said prefetch-based unroll factor by calculating a least common multiple for each one of said prefetch unroll calculated for said each one of said plurality of memory streams; and
   adjust said prefetch-based unroll factor.

43. The computer system of claim 41, wherein said processing system is configured to calculate said prefetch-based kernel unroll factor by adjusting said kernel unroll factor using said prefetch-based unroll factor by virtue of being further configured to:
   compare said prefetch-based unroll factor to said kernel unroll factor;
   determine when said prefetch-based unroll factor and said kernel unroll factor are equal and calculate said prefetch-based kernel unroll factor as equal to said prefetch-based unroll factor;
   determine when said prefetch-based unroll factor is greater than said kernel unroll factor and calculate said prefetch-based kernel unroll factor as equal to said prefetch-based unroll factor; and
   determine when said prefetch-based unroll factor is less than said kernel unroll factor and calculate said prefetch-based kernel unroll factor by virtue of said processing system being still further configured to:
      add said prefetch-based unroll factor to said kernel unroll factor to calculate a sum;
      calculate an adjustment factor as equal to said kernel unroll factor MOD said prefetch-based unroll factor; and
      subtract said adjustment factor from said sum.

44. The computer system of claim 23, wherein said processing system is configured to calculate said prefetch-based kernel unroll factor by virtue of said processing system being further configured to:
   calculate the prefetch-based kernel unroll factor as an integer multiple of the prefetch-based unroll factor.

45. The computer system of claim 23, wherein said processing system being configured to calculate said prefetch-based kernel unroll factor for said loop and to generate said output code minimizes a number of instructions in said output code.

46. The computer system of claim 45, wherein said processing system is configured to insert said prefetch instruction into said output code by virtue of said processing system being further configured to:
   insert said prefetch instruction into said number of instructions.

47. A computer system comprising:
   a storage system configured to store a source code program;
   a processing system that is configured to compile said source code program into output code, said source code program having a loop therein, by virtue of being further configured to:
      calculate a prefetch-based kernel unroll factor for said loop;
      generate said output code using said prefetch-based kernel unroll factor for said loop to unroll the loop; and
      insert a prefetch instruction into said output code subsequent to the generation of said output code by virtue of being further configured to determine a prefetch ordering by virtue of being further configured to:

calculate a group count, said group count representing a count of a plurality of prefetch instructions in said group of instructions; and order said plurality of prefetch instructions;

insert a group of instructions into said output code, said group of instructions including at least one prefetch instruction; and determine an address displacement for said at least one prefetch instruction in said group of instructions.

48. A computer system comprising:

a storage system configured to store a source code program;

a processing system that is configured to compile said source code program into output code, said source code program having a loop therein, by virtue of being further configured to:

calculate a prefetch-based kernel unroll factor for said loop;

generate said output code using said prefetch-based kernel unroll factor for said loop to unroll the loop; and insert a prefetch instruction into said output code subsequent to the generation of said output code by virtue of being further configured to determine a prefetch ordering, insert a group of instructions into said output code, said group of instructions including at least one prefetch instruction, and determine an address displacement for said at least one prefetch instruction in said group of instructions by virtue of being further configured to:
calculate a prefetch ahead distance;
calculate an address based at least in part on said prefetch ahead distance; and
use said address as said address displacement for said at least one prefetch instruction.

49. A computer system comprising:

a storage system configured to store a source code program;

a processing system that is configured to compile said source code program into output code, said source code program having a loop therein, to:

calculate a prefetch-based kernel unroll factor for said loop by virtue of being further configured to:
compare a prefetch-based unroll factor to a kernel unroll factor;
determine when said prefetch-based unroll factor and said kernel unroll factor are equal and calculate said prefetch-based kernel unroll factor as equal to said prefetch-based unroll factor;
determine when said prefetch-based unroll factor is greater than said kernel unroll factor and calculate said prefetch-based kernel unroll factor as equal to said prefetch-based unroll factor; and
determine when said prefetch-based unroll factor is less than said kernel unroll factor and calculate said prefetch-based kernel unroll factor by virtue of said processing system being still further configured to:
add said prefetch-based unroll factor to said kernel unroll factor to calculate a sum;
calculate an adjustment factor as equal to said kernel unroll factor MOD said prefetch-based unroll factor; and
subtract adjustment factor from said sum;

generate said output code using said prefetch-based kernel unroll factor for said loop to unroll the loop; and insert a prefetch instruction into said output code subsequent to the generation of said output code by virtue of being further configured to determine a prefetch ordering, insert a group of instructions into said output code, said group of instructions including at least one prefetch instruction, and determine an address displacement for said at least one prefetch instruction in said group of instructions.

50. A computer system comprising:

a storage system configured to store a source code program;

a processing system that is configured to compile said source code program into output code, said source code program having a loop therein, by virtue of being further configured to calculate the prefetch-based kernel unroll factor as an integer multiple of a prefetch-based unroll factor;

generate said output code using said prefetch-based kernel unroll factor for said loop to unroll the loop; and insert a prefetch instruction into said output code subsequent to the generation of said output code by virtue of being further configured to determine a prefetch ordering, insert a group of instructions into said output code, said group of instructions including at least one prefetch instruction, and determine an address displacement for said at least one prefetch instruction in said group of instructions.

51. A computer system comprising:

a storage system configured to store a source code program;

a processing system that is configured to compile said source code program into output code, said source code program having a loop therein, by virtue of being further configured to:

calculate a prefetch-based kernel unroll factor for said loop;

generate said output code using said prefetch-based kernel unroll factor for said loop to unroll the loop; and insert a prefetch instruction into said output code subsequent to the generation of said output code by virtue of being further configured to determine a prefetch ordering, insert a group of instructions into said output code, said group of instructions including at least one prefetch instruction, and determine an address displacement for said at least one prefetch instruction in said group of instructions;

wherein said processing system being configured to calculate said prefetch-based kernel unroll factor for said loop and to generate said output code minimizes a number of instructions in said output code.

52. The computer system of claim 51, wherein said processing system is configured to insert said prefetch instruction into said output code by virtue of said processing system being further configured to:

insert said prefetch instruction into said number of instructions.

53. A computer program product for compiling a source code program into output code, said source code program having a loop therein, said product comprising:
  code that calculates a prefetch-based kernel unroll factor for the loop, wherein said calculating code comprises
    code that calculates a prefetch-based unroll factor for the loop,
    code that calculates a kernel unroll factor for the loop, and
    code that calculates said prefetch-based kernel unroll factor by adjusting said kernel unroll factor using said prefetch-based unroll factor;
  code that generates the output code using the prefetch-based unroll factor for the loop to unroll the loop;
  code that inserts a prefetch instruction into the output code subsequent to the generation of the output code; and
  a computer-readable medium that stores said code that calculates, said code that generates, and said code that inserts.

54. The computer program product of claim 53, wherein said code that calculates a prefetch-based unroll factor for the loop comprises:
  code that calculates a prefetch unroll for each one of a plurality of memory streams;
  code that determines said prefetch-based unroll factor by calculating a least common multiple for each one of said prefetch unroll calculated for said each one of said plurality of memory streams; and
  code that adjusts said prefetch-based unroll factor.

55. The computer program product of claim 53, wherein said inserting code comprises:
  code that determines a prefetch ordering;
  code that inserts a group of instructions into said output code, said group of instructions including at least one prefetch instruction; and
  code that determines an address displacement for said at least one prefetch instruction in said group of instructions.

56. The computer program product of claim 55, wherein said code that determines said prefetch ordering comprises:
  code tat calculates a group count, said group count representing a count of a plurality of prefetch instructions in said group of instructions; and
  code that orders said plurality of prefetch instructions.

57. The computer program product of claim 55, wherein said code that determines said address displacement comprises:
  code that calculates a prefetch ahead distance;
  code that calculates an address based at least in part on said prefetch ahead distance; and
  code that uses said address as said address displacement for said at least one prefetch instruction.

58. The computer program product of claim 53, wherein said code tat calculates said prefetch-based kernel unroll factor by adjusting said kernel unroll factor using said prefetch-based unroll factor further comprises:
  code that compares said prefetch-based unroll factor to said kernel unroll factor;
  code that determines when said prefetch-based unroll factor and said kernel unroll factor are equal and calculates said prefetch-based kernel unroll factor as equal to said prefetch-based unroll factor;
  code that determines when said prefetch-based unroll factor is greater than said kernel unroll factor and calculates said prefetch-based kernel unroll factor as equal to said prefetch-based unroll factor; and
  code that determines when said prefetch-based unroll factor is less than said kernel unroll factor and calculates said prefetch-based kernel unroll factor by using:
    code that adds said prefetch-based unroll factor to said kernel unroll factor to calculate a sum;
    code that calculates an adjustment factor as equal to said kernel unroll factor MOD said prefetch-based unroll factor; and
    code that subtracts said adjustment factor from said sum.

59. The computer program product of claim 53, wherein said code that calculates said prefetch-based kernel unroll factor by adjusting said kernel unroll factor using said prefetch-based unroll factor further comprises:
  code that calculates the prefetch-based kernel unroll factor as an integer multiple of the prefetch-based unroll factor.

60. The computer program product of claim 53, wherein said code that calculates said prefetch-based kernel unroll factor by adjusting said kernel unroll factor using said prefetch-based unroll factor and said code tat generates said output code minimize a number of instructions in said output code.

61. The computer program product of claim 60, wherein said code that inserts said prefetch instruction into said output code includes:
  code that inserts said prefetch instruction into said number of instructions.

62. A computer-implemented method for compiling source code into output code, said source code having a loop therein, said method comprising:
  calculating a prefetch-based unroll factor for the loop;
  calculating a kernel unroll factor for the loop;
  calculating a prefetch-based kernel unroll factor by adjusting said kernel unroll factor using said prefetch-based unroll factor;
  generating the output code using the prefetch-based kernel unroll factor to unroll the loop; and
  inserting a prefetch instruction into the output code.

63. The method of claim 62, wherein said calculating said prefetch-based unroll factor comprises:
  calculating a prefetch unroll for each one of a plurality of memory streams;
  determining said prefetch-based unroll factor by calculating a least common multiple for each one of said prefetch unroll calculated for said each one of said plurality of memory streams; and
  adjusting said prefetch-based unroll factor.

64. The method of claim 63, wherein said adjusting said prefetch-based unroll factor adjusts said prefetch-based unroll factor based on an adjustment factor, said adjustment factor being bas ed on at least one of (1) an upper limit, (2) a lower limit, and (3) a user directive.

65. The method of claim 64, wherein said user directive is based on at least one of (1) assuming a unit stride if stride is unknown, (2) limiting prefetch unroll to a user-selected value, and (3) using a user-selected stride.

66. The method of claim 62, wherein said inserting comprises:

determining a prefetch ordering;
inserting a group of instructions into said output code, said group of instructions including at least one prefetch instruction; and
determining an address displacement for said at least one prefetch instruction in said group of instructions.

67. The method of claim 66, wherein said determining said prefetch ordering comprises:
    calculating a group count, said group count representing a count of a plurality of prefetch instructions in said group of instructions; and
    ordering said plurality of prefetch instructions.

68. The method of claim 66, wherein said determining said address displacement comprises:
    calculating a prefetch ahead distance;
    calculating an address based at least in part on said prefetch ahead distance; and using said address as said address displacement for said at least one prefetch instruction.

69. The method of claim 66, wherein said inserting further comprises:
    repeating said inserting said group of instructions into said output code and said determining said address displacement, wherein said group of instructions is one of a plurality of such groups of instructions, said repeating placing each one of said plurality of such groups of instructions at substantially even intervals in said output code.

70. The method of claim 62, wherein said calculating said prefetch-based kernel unroll factor by adjusting said kernel unroll factor using said prefetch-based unroll factor further comprises:
    comparing said prefetch-based unroll factor to said kernel unroll factor;
    when said prefetch-based unroll factor and said kernel unroll factor are equal, calculating said prefetch-based kernel unroll factor as equal to said prefetch-based unroll factor;
    when said prefetch-based unroll factor is greater than said kernel unroll factor, calculating said prefetch-based kernel unroll factor as equal to said prefetch-based unroll factor; and
    when said prefetch-based unroll factor is less than said kernel unroll factor, calculating said prefetch-based kernel unroll factor as follows:
        adding said prefetch-based unroll factor to said kernel unroll factor to calculate a sum;
        calculating an adjustment factor as equal to said kernel unroll factor MOD said prefetch-based unroll factor; and
        subtracting said adjustment factor from said sum.

71. The method of claim 62, wherein said calculating said prefetch-based kernel unroll factor by adjusting said kernel unroll factor using said prefetch-based unroll factor comprises:
    calculating the prefetch-based kernel unroll factor as an integer multiple of the prefetch-based unroll factor.

72. The method of claim 62, wherein said calculating said prefetch-based kernel unroll factor by adjusting said kernel unroll factor using said prefetch-based unroll factor and said generating said output code minimize a number of instructions in said output code.

73. The method of claim 72, wherein said inserting said prefetch instruction into said output code includes inserting said prefetch instruction into said number of instructions.

74. A computer system comprising:
    a storage system configured to store a source code program;
    a processing system that is configured to compile said source code program into output code, said source code program having a loop therein, by virtue of being configured to:
        calculate a prefetch-based unroll factor for said loop;
        calculate a kernel unroll factor for said loop;
        add said prefetch-based unroll factor to said kernel unroll factor to calculate a sum;
        calculate an adjustment factor as equal to said kernel unroll factor MOD said prefetch-based unroll factor; and
        subtract said adjustment factor from said sum.

75. The computer system of claim 74, wherein said processing system is configured to calculate said prefetch-based unroll factor for said loop by virtue of being further configured to:
    calculate a prefetch unroll for each one of a plurality of memory streams;
    determine said prefetch-based unroll factor by calculating a least common multiple for each one of said prefetch unroll calculated for said each one of said plurality of memory streams; and
    adjust said prefetch-based unroll factor.

76. The computer system of claim 75, wherein said adjusting said prefetch-based unroll factor adjusts said prefetch-based unroll factor based on an adjustment factor, said adjustment factor being based on at least one of (1) an upper limit, (2) a lower limit, and (3) a user directive.

77. The computer system of claim 76, wherein said user directive is based on at least one of (1) assuming a unit stride if stride is unknown, (2) limiting prefetch unroll to a user-selected value, and (3) using a user-selected stride.

78. The computer system of claim 74, wherein said processing system is configured to insert said prefetch instruction into said output code by virtue of being further configured to:
    determine a prefetch ordering;
    insert a group of instructions into said output code, said group of instructions including at least one prefetch instruction; and
    determine an address displacement for said at least one prefetch instruction in said group of instructions.

79. The computer system of claim 78, wherein said processing system is configured to determine said prefetch ordering by virtue of being further configured to:
    calculate a group count, said group count representing a count of a plurality of prefetch instructions in said group of instructions; and
    order said plurality of prefetch instructions.

80. The computer system of claim 78, wherein said processing system is configured to determine an address displacement by virtue of being further configured to:
    calculate a prefetch ahead distance;
    calculate an address based at least in part on said prefetch ahead distance; and
    use said address as said address displacement for said at least one prefetch instruction.

81. The computer system of claim 78, wherein said insert said group of instructions into said output code further comprises:

repeating said insert said group of instructions into said output code and said determine said address displacement, wherein said group of instructions is one of a plurality of such groups of instructions, said repeating placing each one of said plurality of such groups of instructions at substantially even intervals in said output code.

82. The computer system of claim 74, wherein said processing system is configured to calculate said prefetch-based kernel unroll factor by adjusting said kernel unroll factor using said prefetch-based unroll factor by virtue of being further configured to:
   compare said prefetch-based unroll factor to said kernel unroll factor;
   when said prefetch-based unroll factor and said kernel unroll factor are equal, calculate said prefetch-based kernel unroll factor as equal to said prefetch-based unroll factor;
   when said prefetch-based unroll factor is greater than said kernel unroll factor, calculate said prefetch-based kernel unroll factor as equal to said prefetch-based unroll factor; and
   when said prefetch-based unroll factor is less than said kernel unroll factor, calculate said prefetch-based kernel unroll factor by virtue of said processing system being still further configured to:
      add said prefetch-based unroll factor to said kernel unroll factor to calculate a sum;
      calculate an adjustment factor as equal to said kernel unroll factor MOD said prefetch-based unroll factor; and
      subtract said adjustment factor from said sum.

83. The computer system of claim 74, wherein said processing system is configured to calculate said prefetch-based kernel unroll factor by adjusting said kernel unroll factor using said prefetch-based unroll factor by virtue of being further configured to:
   calculate the prefetch-based kernel unroll factor as an integer multiple of the prefetch-based unroll factor.

84. The computer system of claim 74, wherein said processing system being configured to calculate said prefetch-based kernel unroll factor by adjusting said kernel unroll factor using said prefetch-based unroll factor and to generate said output code minimizes a number of instructions in said output code.

85. The computer system of claim 84, wherein said processing system is configured to insert said prefetch instruction into said output code by virtue of being further configured to:
   insert said prefetch instruction into said number of instructions.

86. A computer program product for compiling a source code program into output code, said source code program having a loop therein, said product comprising:
   code that calculates a prefetch-based unroll factor for the loop;
   code that calculates a kernel unroll factor for the loop;
   code that calculates a prefetch-based kernel unroll factor by adjusting said kernel unroll factor using said prefetch-based unroll factor;
   code that generates the output code using said prefetch-based kernel unroll factor for the loop to unroll the loop;
   code that inserts a prefetch instruction into the output code; and
   a computer-readable medium that stores said code that calculates said prefetch-based unroll factor, said code that calculates said kernel unroll factor, said code that calculates said prefetch-based kernel unroll factor, said code that generates, and said code that inserts.

87. The computer program product of claim 86, wherein said code that calculates said prefetch-based unroll factor for the loop comprises:
   code that calculates a prefetch unroll for each one of a plurality of memory streams;
   code that determines said prefetch-based unroll factor by calculating a least common multiple for each one of said prefetch unroll calculated for said each one of said plurality of memory streams; and
   code that adjusts said prefetch-based unroll factor.

88. The computer program product of claim 87, wherein said adjusting said prefetch-based unroll factor adjusts said prefetch-based unroll factor based on an adjustment factor, said adjustment factor being based on at least one of (1) an upper limit, (2) a lower limit, and (3) a user directive.

89. The computer program product of claim 88, wherein said user directive is based on at least one of (1) assuming a unit stride if stride is unknown, (2) limiting prefetch unroll to a user-selected value, and (3) using a user-selected stride.

90. The computer program product of claim 86, wherein said code that inserts said prefetch instruction into said output code comprises:
   code that determines a prefetch ordering;
   code that inserts a group of instructions into said output code, said group of instructions including at least one prefetch instruction; and
   code that determines an address displacement for said at least one prefetch instruction in said group of instructions.

91. The computer program product of claim 90, wherein said code that determines said prefetch ordering comprises:
   code that calculates a group count, said group count representing a count of a plurality of prefetch instructions in said group of instructions; and
   code that orders said plurality of prefetch instructions.

92. The computer program product of claim 90, wherein said code that determines said address displacement comprises:
   code that calculates a prefetch ahead distance;
   code that calculates an address based at least in part on said prefetch ahead distance; and
   code that uses said address as said address displacement for said at least one prefetch instruction.

93. The computer program product of claim 90, wherein said code that inserts said group of instructions into said output code further comprises:
   code that repeats said inserting said group of instructions into said output code and said determining said address displacement, wherein said group of instructions is one of a plurality of such groups of instructions, said repeating placing each one of said plurality of such groups of instructions at substantially even intervals in said output code.

94. The computer program product of claim 86, wherein said code that calculates said prefetch-based kernel unroll factor by adjusting said kernel unroll factor using said prefetch-based unroll factor further includes:
- code to compare said prefetch-based unroll factor to said kernel unroll factor;
- code to determine that said prefetch-based unroll factor and said kernel unroll factor are equal and to calculate said prefetch-based kernel unroll factor as equal to said prefetch-based unroll factor;
- code to determine that said prefetch-based unroll factor is greater than said kernel unroll factor and to calculate said prefetch-based kernel unroll factor as equal to said prefetch-based unroll factor; and
- code to determine that said prefetch-based unroll factor is less than said kernel unroll factor and to calculate said prefetch-based kernel unroll factor by virtue of further including:
  - code to add said prefetch-based unroll factor to said kernel unroll factor to calculate a sum;
  - code to calculate an adjustment factor as equal to said kernel unroll factor MOD said prefetch-based unroll factor; and
  - code to subtract said adjustment factor from said sum.

95. The computer program product of claim 86, wherein said code that calculates said prefetch-based kernel unroll factor by adjusting said kernel unroll factor using said prefetch-based unroll factor further includes:
- code calculate the prefetch-based kernel unroll factor as an integer multiple of the prefetch-based unroll factor.

96. The computer program product of claim 86, wherein said code that calculates said prefetch-based kernel unroll factor by adjusting said kernel unroll factor using said prefetch-based unroll factor and said code to generate said output code minimizes a number of instructions in said output code.

97. The computer program product of claim 96, wherein said code to insert said prefetch instruction into said output code further includes:
- code to insert said prefetch instruction into said number of instructions.

* * * * *

UNITED STATES PATENT AND TRADEMARK OFFICE
CERTIFICATE OF CORRECTION

PATENT NO. : 6,341,370 B1
DATED : January 22, 2002
INVENTOR(S) : Partha Pal Tirumalai and Rajagopalan Mahadevan It is certified that error appears in the above-identified patent and that said Letters Patent is hereby corrected as shown below:

Column 21,
Line 6, please delete "man" and insert -- than --.

Column 23,
Line 17, please delete "tan" and insert -- than --.
Line 41, please delete "34" and insert -- 39 --.

Column 25,
Line 44, please insert -- by virtue of being further configured -- between "therein," and "to:"

Column 26, line 14 through Column 26, line 35,
Claim 50, should read as follows:

--50. A computer system comprising:
a storage system configured to store a source code program;
a processing system that is configured to compile said source code program into output code,
said source code program having a loop therein, by virtue of being further configured to:
calculate a prefetch-based kernel unroll factor for said loop, by virtue of being further configured to calculate the prefetch-based kernel unroll factor as an integer multiple of a prefetch-based unroll factor;
generate said output code using said prefetch-based kernel unroll factor for said loop to unroll the loop; and
insert a prefetch instruction into said output code subsequent to the generation of said output code by virtue of being further configured to
determine a prefetch ordering,
insert a group of instructions into said output code, said group of instructions including at least one prefetch instruction, and
determine an address displacement for said at least one prefetch instruction in said group of instructions.--

Column 27,
Line 58, please delete "tat" and insert -- that --.

Column 28,
Line 59, please delete "bas ed" and insert -- based --.

UNITED STATES PATENT AND TRADEMARK OFFICE
CERTIFICATE OF CORRECTION

PATENT NO. : 6,341,370 B1
DATED : January 22, 2002
INVENTOR(S) : Partha Pal Tirumalai and Rajagopalan Mahadevan It is certified that error appears in the above-identified patent and that said Letters Patent is hereby corrected as shown below:

<u>Column 30,</u>
Lines 1 through 15, Claim 74, should read as follows:

--74. A computer system comprising:

a storage system configured to store a source code program;

a processing system that is configured to compile said source code program into output code, said source code program having a loop therein, by virtue of being configured to:

calculate a prefetch-based unroll factor for said loop;

calculate a kernel unroll factor for said loop;

calculate a prefetch-based kernel unroll factor by adjusting said kernel unroll factor using said prefetch-based unroll factor;

generate said output code using said prefetch-based kernel unroll factor to unroll the loop; and insert a prefetch instruction into said output code.--

Signed and Sealed this

Sixteenth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,341,370 B1  
DATED : January 22, 2002  
INVENTOR(S) : Partha Pal Tirumalai and Rajagopalan Mahadevan It is certified that error appears in the above-identified patent and that said Letters Patent is hereby corrected as shown below:

Column 21,  
Line 6, please delete "man" and insert -- than --.

Column 23,  
Line 17, please delete "tan" and insert -- than --.  
Line 41, please delete "34" and insert -- 39 --.

Column 25,  
Line 44, please insert -- by virtue of being further configured -- between "therein," and "to:"

Column 26,  
Lines 14-35, Claim 50 should read as follows:

--50. A computer system comprising:
a storage system configured to store a source code program;
a processing system that is configured to compile said source code program into output code,
    said source code program having a loop therein, by virtue of being further configured to:
    calculate a prefetch-based kernel unroll factor for said loop, by virtue of being further
        configured to calculate the prefetch-based kernel unroll factor as an integer
        multiple of a prefetch-based unroll factor;
    generate said output code using said prefetch-based kernel unroll factor for said loop
        to unroll the loop; and
    insert a prefetch instruction into said output code subsequent to the generation of said
        output code by virtue of being further configured to
        determine a prefetch ordering,
        insert a group of instructions into said output code, said group of instructions
            including at least one prefetch instruction, and
    determine an address displacement for said at least one prefetch instruction in said
        group of instructions.--

Column 27,  
Line 58, please delete "tat" and insert -- that --.

UNITED STATES PATENT AND TRADEMARK OFFICE
CERTIFICATE OF CORRECTION

PATENT NO. : 6,341,370 B1
DATED : January 22, 2002
INVENTOR(S) : Partha Pal Tirumalai and Rajagopalan Mahadevan It is certified that error appears in the above-identified patent and that said Letters Patent is hereby corrected as shown below:

Column 28,
Line 59, please delete "bas ed" and insert -- based --.

Column 30,
Lines 1-15, Claim 74 should read as follows:

--74. A computer system comprising:
a storage system configured to store a source code program;
a processing system that is configured to compile said source code program into output code,
    said source code program having a loop therein, by virtue of being configured to:
    calculate a prefetch-based unroll factor for said loop;
    calculate a kernel unroll factor for said loop;
    calculate a prefetch-based kernel unroll factor by adjusting said kernel unroll factor
        using said prefetch-based unroll factor;
    generate said output code using said prefetch-based kernel unroll factor to unroll the
        loop; and
    insert a prefetch instruction into said output code.--

Signed and Sealed this

Thirtieth Day of March, 2004

JON W. DUDAS
*Acting Director of the United States Patent and Trademark Office*